US007957028B2

(12) United States Patent
Nakaya et al.

(10) Patent No.: US 7,957,028 B2
(45) Date of Patent: Jun. 7, 2011

(54) ORDER PROCESSING SYSTEM FOR PERFORMING IMAGE REPRODUCTION PROCESSING IN RESPONSE TO ORDER FOR REPRODUCING DIGITAL IMAGE DATA

(75) Inventors: Yoshihito Nakaya, Kanagawa (JP);
Eiichi Kito, Kanagawa (JP); Tsuyoshi Tanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1197 days.

(21) Appl. No.: 11/637,818

(22) Filed: Dec. 13, 2006

(65) Prior Publication Data
US 2007/0133048 A1 Jun. 14, 2007

(30) Foreign Application Priority Data

Dec. 14, 2005 (JP) ................................. 2005-360439

(51) Int. Cl.
*G06F 3/12* (2006.01)
(52) U.S. Cl. .......... 358/1.9; 358/1.1; 358/1.18; 358/448; 358/452; 358/453
(58) Field of Classification Search .................. 358/1.9, 358/1.11–1.16, 1.1, 501, 504, 448, 452, 453
See application file for complete search history.

(56) References Cited

U.S. PATENT DOCUMENTS

| 5,584,036 | A | | 12/1996 | Kashihara | |
|---|---|---|---|---|---|
| 5,585,856 | A | * | 12/1996 | Nakaya et al. | 348/441 |
| 6,327,050 | B1 | * | 12/2001 | Motamed et al. | 358/1.18 |
| 6,809,833 | B1 | * | 10/2004 | Blair et al. | 358/1.16 |
| 7,172,260 | B2 | * | 2/2007 | Yoshida et al. | 347/7 |
| 7,410,311 | B2 | * | 8/2008 | Suzuki et al. | 400/76 |
| 7,528,988 | B2 | * | 5/2009 | Agehama et al. | 358/1.9 |
| 2004/0186801 | A1 | * | 9/2004 | Morita | 705/32 |

FOREIGN PATENT DOCUMENTS

| JP | 07-092648 A | 4/1995 |
|---|---|---|
| JP | 08-166640 A | 6/1996 |
| JP | 9-114004 A | 5/1997 |
| JP | 2000-341455 A | 12/2000 |
| JP | 2004-054480 A | 2/2004 |

OTHER PUBLICATIONS

Notification of Reasons for Refusal, dated Feb. 1, 2011, issued in corresponding JP Application No. 2005-360439, 7 pages in English and Japanese.

* cited by examiner

*Primary Examiner* — Chan S Park
(74) *Attorney, Agent, or Firm* — Sughrue Mion, PLLC

(57) ABSTRACT

An order processing system for performing reproduction processing according to a reproduction processing order by receiving an input image and the reproduction processing order of the input image is provided. The system has a management unit and an execution unit. The management unit is for generating per order a piece of job instruction information to instruct process contents, a process execution sequence, and a process execution destination for reproduction processing according to contents of the reproduction processing order, and managing an execution of the reproduction processing. The execution unit has a plurality of components for executing one or more of a plurality of steps of the reproduction processing, for receiving the input image and the job instruction information and executing the reproduction processing according to the job instruction information.

12 Claims, 12 Drawing Sheets

| INPUT | PROCESSING | OUTPUT |
|---|---|---|
| FILM 135 NEGATIVE | TRIMMING | PRINT 100 × 200 |
| FILM 135 SEPIA | RED-EYE CORRECTION | PRINT 150 × 250 |
| MEMORY STICK | TEMPLATE COMBINATION | CD-R |
| ZIP | COLOR CORRECTION | ZIP |
| ⋮ | ⋮ | ⋮ | a~b : PROCESS TYPES
<n> : PROCESS IDENTIFIER

INFORMATION REGARDING PROCESS
n: PROCESS IDENTIFIER
Ac-k: IDENTIFIER OF Ac FOR EXECUTING PROCESS
INPUT PARAMETER i: I/O PARAMETER WHEN PROCESS IS EXECUTED

ORDER PROCESSING SYSTEM FOR PERFORMING IMAGE REPRODUCTION PROCESSING IN RESPONSE TO ORDER FOR REPRODUCING DIGITAL IMAGE DATA

BACKGROUND OF THE INVENTION

The present invention relates to an order processing system for performing image reproduction processing in response to an order for reproducing digital image data as a photographic print or other products.

With a recent gain in popularity of a digital technology, it has been a common practice to handle images in digital form in an image order processing system at a so-called photo lab or the like. Digital image data obtained by photoelectrically reading an image photographed in a photographic film or digital image data obtained by photographing of a digital camera is used, and subjected to digital image processing, and the photographed image is thereby reproduced as a photographic print or other products.

Along with the circumstances described above, an image input form (image ordering form) is not limited to a use of a conventional photographic film. Images can be inputted through a recording medium where photographed image data has been recorded by a digital camera, or through a transfer of image data via a network. As regards an image output form, there has been a variety of services, including printing the image by using various printers of a silver salt system, an electrophotographic system, an ink jet system, and the like, and re-writing the image in a recording medium after image processing.

As an apparatus for receiving processing services of digital image data, for example, JP 09-114004 A discloses an image data service apparatus which includes an input unit constituted of multiple kinds of input apparatus such as a scanner for entering image data and a memory card reader, an image data service apparatus main body (processor) for processing the image data, and an output unit constituted of plural kinds of output apparatus such as a printer for outputting the processed image data and a memory card writer.

This image data service apparatus is capable of inserting characters and illustrations into the input image, enlarging/reducing the image, and process deformations. This apparatus edits the input image data in the processed portions based on input image processing conditions (designating each processing). When two or more kinds of processing are designated, a controller controls the portions for each processing in a designated sequence to subject the input image data to the processing in sequence.

However, for a digital image processed by such an order processing system, the amount of image data tends to increase more and more with recent higher pixelation of the digital camera. Accordingly, in a system such as that disclosed in JP 09-114004 A for moving input real image data to each processing unit for each processing to process and output the data, there occurs a problem in that an increase in the amount of image data causes a great drop in processing capacity.

Viewed from another aspect, as described in JP 09-114004 A, the conventional order processing system has a system-dedicated controller to control each apparatus constructing the system. In the image data service apparatus of JP 09-114004 A, a controller disposed in the image data service apparatus main body is an apparatus-dedicated controller for controlling the entire apparatus to enter the image data from the input unit, process the image data, output the processed image data, and the like.

Thus, even when an apparatus is added or changed to another type at the photo lab or the like which adopts the order processing system, it is difficult to control the apparatus by a single controller by organically connecting it to the existing system. It is therefore difficult to meet a demand for flexibly improving the existing system, and expanding processing functions and providable services.

Also, when many types and functions are employed for apparatuses constituting the order processing system to deal with a variety of orders, a process is diversified according to orders, causing a problem of complex control of the entire system.

Further, when there is a request for simultaneously outputting image data input as a single order to different printers or separately between prints and recording media, different image processes are necessary according to the output apparatus in the midway. Thus, such an order cannot be easily dealt with, and there arises a need, for example, to process the order as a plurality of independent orders among the different apparatuses.

SUMMARY OF THE INVENTION

In order to solve the aforementioned problems of the conventional art, it is an object of the invention to provide an order processing system capable of preventing a drop in processing capacity even when the amount of image data increases.

It is another object of the present invention to provide a highly expandable and flexible order processing system capable of adding or changing apparatus of an existing system.

It is yet another object of the present invention to provide an order processing system capable of flexibly dealing with various types of orders.

To solve the above-mentioned problems, the present invention provides an order processing system for performing reproduction processing according to a reproduction processing order by receiving an input image and the reproduction processing order of the input image. The order processing system is characterized by including a management unit for generating per order a piece of job instruction information to instruct process contents, a process execution sequence, and a process execution destination for reproduction processing according to contents of the reproduction processing order, and managing an execution of the reproduction processing; and an execution unit including a plurality of components for executing one or more of a plurality of steps of the reproduction processing, for receiving the input image and the job instruction information and executing the reproduction processing according to the job instruction information.

Preferably, said execution unit includes an image processing unit for generating a logical image which is a handle image of a real image from the real image of the received input image and executing processing for the real image; and a job processing unit for executing processing job by using the logical image based on the job instruction information; and wherein said image processing unit executes the processing for the real image based on a result of the processing job carried out for the logical image by said job processing unit.

Preferably, each component of said execution unit discloses potential capacity information and current capacity information of itself to an outside of said execution unit.

Preferably, the order processing system further includes an order reception unit for receiving the reproduction processing order of the input image, wherein said management unit obtains the potential capacity information and the current capacity information of said component disclosed by each component of said execution unit, and creates a list of receivable order contents to present the receivable order contents based on the list to said order reception unit.

Preferably, said management unit refers to the potential capacity information and the current capacity information of said component disclosed by each component of said execution unit to assign each step of the reproduction processing to the component capable of dealing with the step, thereby generating the job instruction information.

Preferably, said execution unit divides the job instruction information at the time of branching a process when two or more types of reproduction processing are included in one reproduction processing order, and executes steps of the two or more types of reproduction processing in parallel according to the divided job instruction information.

Preferably, said execution unit combines the divided pieces of job instruction information at a last step of the reproduction processing to output the combined job instruction information to an outside.

To solve the above-mentioned problems, the present invention provides an order processing system for performing reproduction processing according to a reproduction processing order by receiving an input image and the reproduction processing order of the input image. The order processing system is characterized by including a management unit for receiving the reproduction processing order, and managing an execution of the reproduction processing according to the order; and an image processing unit for receiving the input image, generating a logical image which is a handle image of a real image from the real image of the input image, and executing processing for the real image, and a job processing unit for executing processing job by using the logical image according to the reproduction processing order; wherein said image processing unit executes the processing for the real image based on a result of the processing job carried out for the logical image by said job processing unit.

According to the present invention, stable processing capacity can be secured even when the amount of image data increases.

Also, according to the present invention, it is possible to provide a highly flexible and expandable order processing system which can control the apparatus by organically connecting to the existing system even when apparatuses are added or changed for the existing system.

Further, according to the present invention, it is possible to flexibly deal with various types of orders.

DESCRIPTION OF THE PREFERRED EMBODIMENT

The preferred embodiments of the order processing systems of the present invention will be described below in detail with reference to the accompanying drawings.

Figure 1:
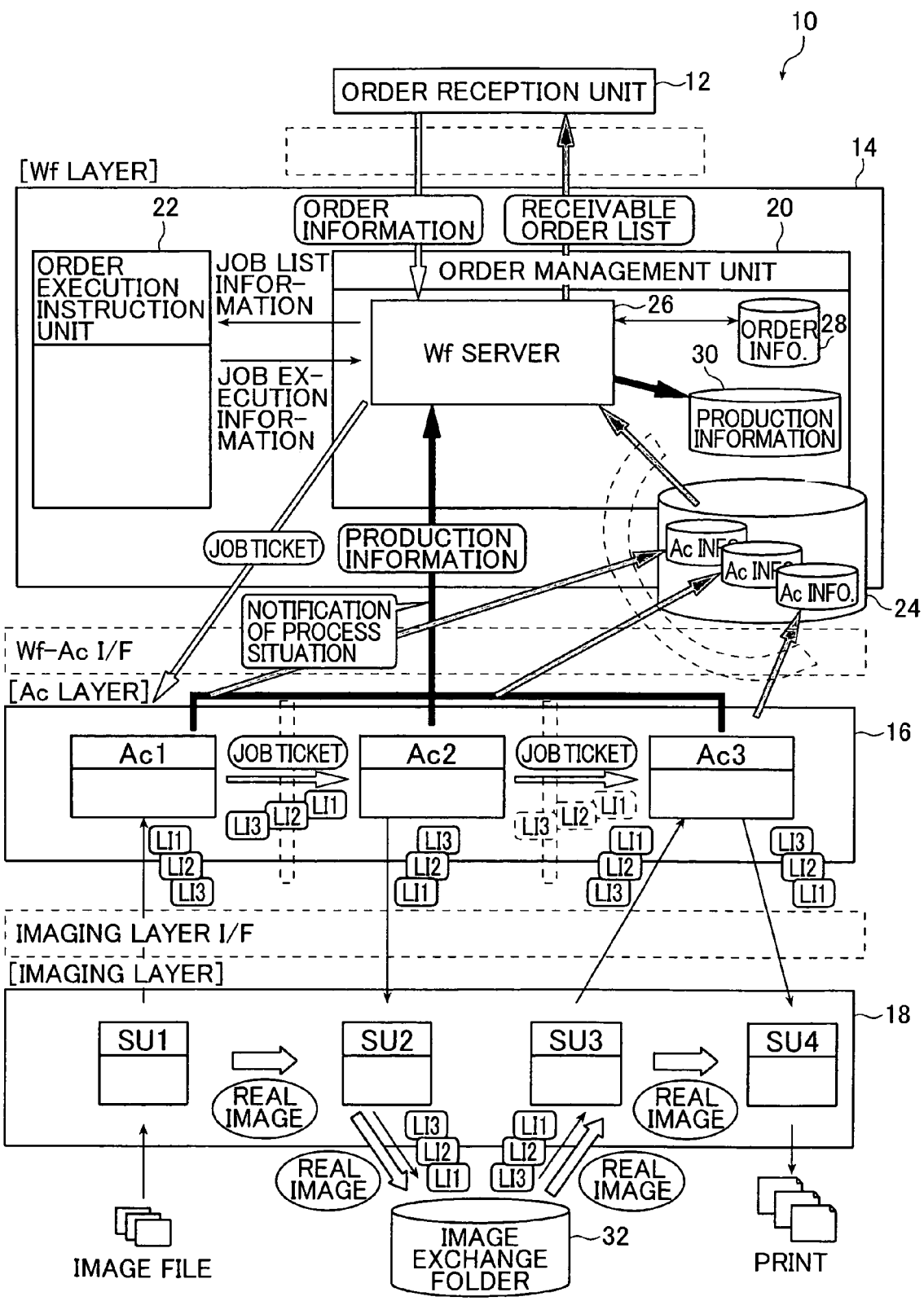
FIG. 1 is a block diagram showing a schematic configuration of an order processing system according to an embodiment of the present invention.

FIG. 1 is a block diagram showing a schematic configuration of an order processing system according to an embodiment of the present invention. An order processing system 10 shown in FIG. 1 receives various image reproduction processing orders, e.g., making photoprints, image reproduction on various products such as T-shirts or mugs, and saving of image data in recording media such as CD, and performs reproduction processing according to the orders. The order processing system 10 includes an order reception unit 12, a workflow layer (Wf layer) 14 serving as a management unit, an activity layer (Ac layer) 16 serving as a job processing unit, and an imaging layer 18 serving as an image processing unit.

In FIG. 1, the workflow layer 14, the activity layer 16, and the imaging layer 18 schematically show a software structure of the order processing system 10.

The order processing system 10 is a distributed system in which a plurality of apparatuses cooperate to execute one order. In other words, the order processing system 10 includes a plurality of apparatuses having different functions in a hardware structure, and the apparatuses share functions to constitute, in combination, a software structure which is a three-layer structure constituted of the workflow layer 14, the activity layer 16, and the imaging layer 18 shown in FIG. 1.

To be specific, for example, the order processing system 10 may include an order acceptance machine which functions as the order reception unit 12, and a controller, an input machine, and an output machine which share the plurality of functions of the workflow layer 14, the activity layer 16, and the imaging layer 18. Such an apparatus configuration example will be described below.

In FIG. 1, each of broken line frames between the layers and between components of the layer schematically indicates an interface. For the interface between the layers or between the components, an interface corresponding to a configuration of each unit may be used.

For information transfer between the order reception unit 12 and the workflow layer 14, an interface compliant with a predefined laboratory information order standard is used. Accordingly, any computer or the like can function as the order reception unit 12 by having or involving software to generate order information compliant with the laboratory information order standard.

The order reception unit 12 receives an image reproduction processing order such as making photoprints from a customer. The order reception unit 12 receives order contents and image data of an order target image (input image), sends information of the order contents (order information) to the workflow layer 14, and stores the order target image data in a storage unit SU of the imaging layer 18.

When receiving the order from the customer, the order reception unit 12 receives a receivable order list indicating orders which can be dealt with by the order processing system 10 from the workflow layer 14 (workflow server 26 described below), and displays types of receivable orders on the menu of a monitor or the like based on the receivable order list. Thus, the customer can select a desired order from all the orders which can be dealt with by the order processing system 10.

The workflow layer 14 functions as a workflow management unit in the order processing system 10, and includes an order management unit 20, an order execution instruction unit 22, and an apparatus open information database 24.

The order management unit 20 includes the workflow server (Wf server) 26, an order information database 28, and a production information database 30.

The workflow server 26 refers to apparatus open information held in the apparatus open information database 24 described below to investigate a capacity or the like of the apparatus in the order processing system 10, creates a receivable order list which is a list of inputs/processes/outputs which can be processed by the order processing system 10, and sends the receivable order list to the order reception unit 12.

The receivable order list may be changed by an operator to reflect a system hardware configuration, installed software, and a set value (print size limit or the like) at a laboratory which uses the system.

The workflow server 26 receives order information from the order reception unit 12 to register the order information in the order information database 28, and generates a job ticket which is job instruction information in the order processing system 10 based on the order information and a system situation. The generated job ticket is sent to the activity layer 16 which executes an image reproduction job (processing work). The activity layer 16 executes the job according to the job ticket.

The workflow server 26 monitors an execution situation of the job defined in the job ticket.

According to the present invention, the job ticket is equivalent to a so-called job instruction for processing an order in the order processing system 10, and has information defining a step execution sequence (process flow) for processing the order, processing contents, and an execution destination (apparatus). One job ticket is issued for one order.

A form of the job ticket is standardized so that the job ticket can have generality among various apparatuses used at a photo laboratory.

Examples of information described in such the job ticket include: information of a process type such as image data inputting, verification, combining, or outputting; information of special processing such as red-eye correcting, trimming, date printing, or template combining; and output related information on an output product type, a print size, output resolution, or the like. Such information is described in form complaint with a predetermined standard understandable to various processing apparatuses.

The order information database 28 saves currently received order information yet to be processed. The order information sent from the order reception unit 12 is registered in the order information database 28 by the workflow server 26. The order information registered in the order information database 28 is used for displaying a list of orders in the order execution instruction unit 22 and for generating job tickets in the workflow server 26.

The production information database 30 saves information regarding a job execution situation in the activity layer 16. The activity layer 16 includes a plurality of activity components Ac for executing one or more of a plurality of steps (image input step, verification step, image processing step such as image combining, print output step, and the like) necessary for image reproduction processing. Information on a job execution situation (e.g., start or end of the job) in each activity component Ac is notified as production information to the workflow server 26, and registered in the production information database 30 by the workflow server 26.

The production information recorded in the production information database 30 is used for a process management in the order processing system 10.

In the order management unit 20, the workflow server 26 can return the production information by referring to the production information database 30 when a production information request (inquiry about process progress situation) is input by the customer (or user) or a laboratory manager (or operator) via the order reception unit 12 or a user interface connected to the workflow layer 14.

Further, upon reception of order by the order reception unit 12, the workflow server 26 calculates delivery time and returns the calculated delivery time to the order reception unit 12 by referring to the production information database 30.

According to the preferred embodiment of the present invention, in addition to normal processing (normal mode; normal delivery time processing taking spare time into consideration), the order processing system 10 can selectively execute short-delivery processing (express mode) in which the processing is executed with delivery shorter than normal (a few minutes after the time of order reception, for instance), by taking precedence over normal processing.

In the order processing system 10, the workflow server 26 refers to the production information database 30 to manage a scheduled progress of each job defined in a job ticket and currently executed in the order processing system 10 and to consider processing contents of a job to be executed, and schedules its processing step when a new order comes.

In other words, the workflow server 26 functions as schedule creation means for deciding a processing sequence of jobs from processing contents of the currently processed job, a processing situation of the currently processed job, and processing contents of the job to be executed, and schedule editing means for changing a processing sequence according to the processing situation of the executed job.

For example, if there is spare time until scheduled completion time of the currently executed job, the workflow server 26 notifies the order reception unit 12 that the system can execute the express mode. Upon reception of this notification, the order reception unit 12 displays that the express mode is selectable on an order reception screen.

From the information on the screen, the customer who makes a new order can select the express mode or the normal mode.

On the other hand, in the order processing system 10, if there is no spare time to process the steps because of processing of a plurality of jobs of the express mode or errors occurred during the processing, inhibition of the express mode is notified to the order reception unit 12. In this case, the order reception unit 12 displays inhibition of accepting the express mode at present on the order reception screen. Alternatively, the selection menu of the express mode may not be displayed.

The order execution instruction unit 22 instructs order execution of unprocessed orders registered in the order information database 28.

The order execution instruction unit 22 is connected to a display unit (monitor or the like) (not shown), and obtains list information of orders (jobs) registered in the order information database 28 via the workflow server 26 to display the list information in the display unit. The order execution instruction unit 22 is connected to an instruction input unit (keyboard, mouse, touch panel disposed in the display unit, or the like) (not shown), and issues execution instruction (information) of a selected order to transmit the instruction to the workflow server 26 when the operator selects the order to be executed from the order list by operating the instruction input unit.

The order execution instruction unit 22 may automatically issue order execution instruction without the order selection by the operator.

The apparatus open information database 24 holds apparatus open information indicating a capacity of each apparatus constituting the order processing system 10.

The apparatus open information is various pieces of information which the component of each apparatus constituting the order processing system 10 opens to the outside (user of the apparatus or the other apparatus), and contains at least activity information (Ac information) which is capacity information of each activity component Ac belonging to the activity layer 16.

Each activity component Ac discloses activity information (Ac information) which is its own capacity information to the workflow layer 14, and the activity information is saved in the apparatus open information database 24.

As described above, the order processing system 10 is a distributed system in which the plurality of apparatuses cooperate to execute one order. Accordingly, in processing execution, information exchange is essential among the apparatuses. The apparatus open information is used for this information exchange among the apparatuses.

The apparatus open information contains a name for identifying an activity component AC, an executable process flow of the activity component Ac, and potential and current capacities of the activity component Ac.

The potential capacity information of the activity component Ac is information regarding a capacity potentially owned by the activity component Ac (apparatus having its function). In other words, the potential capacity information is information regarding a capacity to be executed at the maximum according to apparatus specifications.

An example thereof is information on an available print size according to corresponding printer specifications in the case of an activity component Ac of a print output step.

The current capacity information of the activity component Ac is information regarding a capacity to be used at present by the activity component Ac (apparatus having its function) based on apparatus setting.

An example thereof is information on an available print size by using a paper size currently set in the printer among available print sizes as a potential capacity.

The apparatus open information held in the apparatus open information database 24 is used for creating a receivable order list indicating executable orders of the order processing system 10 and generating job tickets in the workflow server 26.

For creating the receivable order list, the potential capacity information of the activity component Ac is mainly used. For generating the job tickets, the current capacity information and the potential capacity information of the activity component Ac are both used.

The activity layer 16 and the imaging layer 18 function as execution units of image reproduction processing. The activity layer 16 functions as a job processing unit to execute processing a job by using a handle image of a processing target image according to a job ticket. The imaging layer 18 functions as an image processing unit to execute processing for a real image by reflecting the processing job of the activity layer 16 in real image data.

The imaging layer 18 temporarily saves image data (real image) which is a target of an order received by the order reception unit 12 in the storage unit SU, and generates a logical image LI which is a handle image of the real image. Then, according to a request from the activity layer 16, the imaging layer 18 sends the logical image LI corresponding to the request to the activity layer 16.

The logical image LI is attribute information in which basic information of an image indicating a size, a center coordinate, and vertical information of the real image, and image edit information are linked with the real image, and its data size is much smaller than the real image data.

The imaging layer 18 receives the logical image LI processed by the activity layer 16, reflects a result of processing job (image edit processing or the like) carried out by using the logical image LI to the real image, in other words, executes processing for the real image, and reproduces the processed image in a photographic print or another product to output the processed image as a product.

A plurality of processes in the imaging layer 18 are shared by a plurality of apparatuses in hardware. To be specific, for example, as hardware constituting the order processing system 10, an image data input machine such as a film scanner or a media drive (data fetching apparatus), an image processor, a controller, an image output machine such as a printer/processor, an image data output machine such as a media drive (data writer), and the like are used, and those apparatuses share the plurality of processes in the imaging layer 18.

Each apparatus constituting the image layer 18 includes a storage unit SU for holding a real image which is a processing target in the apparatus. Accordingly, there exist a plurality of storage units SU constituting the imaging layer 18. FIG. 1 shows four storage units SU (SU1, SU2, SU3, and SU4) as an example.

As the functions of the imaging layer 18 are shared by the plurality of apparatuses, the real image of the processing target and its logical image LI must be moved among the apparatuses (storage units SU) according to processing steps. Transfer of the real image and the logical image LI among the storage units SU of the imaging layer 18 is carried out via an image exchange folder 32 connected to the imaging layer 18.

The activity layer 16 executes processing work based on the job tickets generated by the workflow server 26 of the workflow layer 14 by using the logical image LI generated by the imaging layer 18.

The activity layer 16 has a plurality of activity components Ac for executing one or more of a plurality of steps necessary for image reproduction processing, and executes predetermined processing in predetermined activity components Ac in predetermined sequence based on the job tickets. FIG. 1 shows three activity components Ac (Ac1, Ac2, and Ac3) as an example. The activity components Ac of the activity layer 16 are shared by the plurality of apparatuses described above constituting the order processing system 10 in hardware.

The activity layer 16 (activity components Ac) requests the logical image LI of the processing target image to the imaging layer 18 (storage unit SU) in order to execute the processing based on the job tickets. Then, the activity layer 16 executes processing described in the job tickets for logical image LI sent from the imaging layer 18, and adds executed contents or a result to the logical image LI.

The activity layer 16 sends the logical image LI having the processed contents added thereto to the imaging layer 18 by a predetermined timing such as a processing end of one activity component Ac.

The imaging layer 18 receives the logical image LI sent from the activity layer 16, and executes similar processing for the real image according to the processing contents added to the logical image LI. Accordingly, the processing in the activity layer 16 is reflected in the real image.

In other words, the activity layer 16 transmits the processing contents of the real image to the imaging layer 18 via the logical image LI.

Upon reception of a request of the logical image LI of the processed image from the activity layer 16, the imaging layer 18 generates a logical image LI of the real image which reflects previous processing to send the generated logical image LI to the activity layer 16.

For example, in the case of executing a verification step of an image, the activity component Ac (Ac of image editing apparatus) of the activity layer 16 for verification displays a image to be verified based on the logical image LI sent from the imaging layer 18, and adds an image correction amount (correction value of color density) instructed for the verifying image to the logical image LI.

When instructed to display the verifying image again, the activity layer 16 sends the logical image LI having the image correction amount added thereto to a corresponding storage unit SU (SU of image editing apparatus) of the imaging layer 18. The imaging layer 18 executes image correction for the real image based on the description of the logical image LI, and then generates a logical image LI again to send the generated logical image LI to the activity component Ac of the activity layer 16.

For example, in the case of executing a printing step, an activity component Ac (Ac of printer) for outputting a print of the activity layer 16 sends a logical image LI of a target image to a corresponding storage unit SU (SU of printer). Accordingly, the printer outputs a print of a real image linked with the logical image LI.

Thus, the order processing system 10 of the present invention has a feature that the execution unit of the image reproduction processing includes the two layers, i.e., the activity layer 16 and the imaging layer 18.

With this configuration, it is possible to reduce loads on the activity layer 16 which executes processing job according to a workflow by separating the processing job using the logical image LI from the processing of the real image for reflecting the processing job in the real image. Even when a data amount of a real image is large, it is possible to secure stable processing capacity by preventing a drop in processing capacity.

Also, with this configuration, the workflow layer 14 can manage a job progress in the activity layer 16 without being aware of processing of the real image in the imaging layer 18 but being aware of the activity layer 16 alone. Thus, it is possible to prevent complex job process management even when the order processing system 10 is expanded.

The order processing system 10 of the present invention has a feature that a job ticket prepared according to the standard so as to be provided with generality among various apparatuses is used as the interface (I/F) between the workflow layer 14 serving as the workflow management unit and the activity layer 16 serving as the execution unit for executing the workflow, and the plurality of apparatuses sharing the plurality of activity components Ac of the activity layer 16 carry out jobs based on the job ticket.

Thus, by executing and managing jobs at the input machine, the output machine, and the like constituting the order processing system 10 based on common information called the job ticket, it is possible to provide a highly expandable and flexible system which can easily deal with changes or additions of apparatuses constituting the order processing system 10.

Next, an example of applying the order processing system 10 of the present invention to a specific apparatus will be described.

As described above, the order processing system 10 of the present invention includes components which belong to the three layers, i.e., the workflow layer 14, the activity layer 16, and the imaging layer 18. Those components can be arranged in a plurality of apparatuses. However, the order management unit 20 is arranged in one system.

Figure 2:
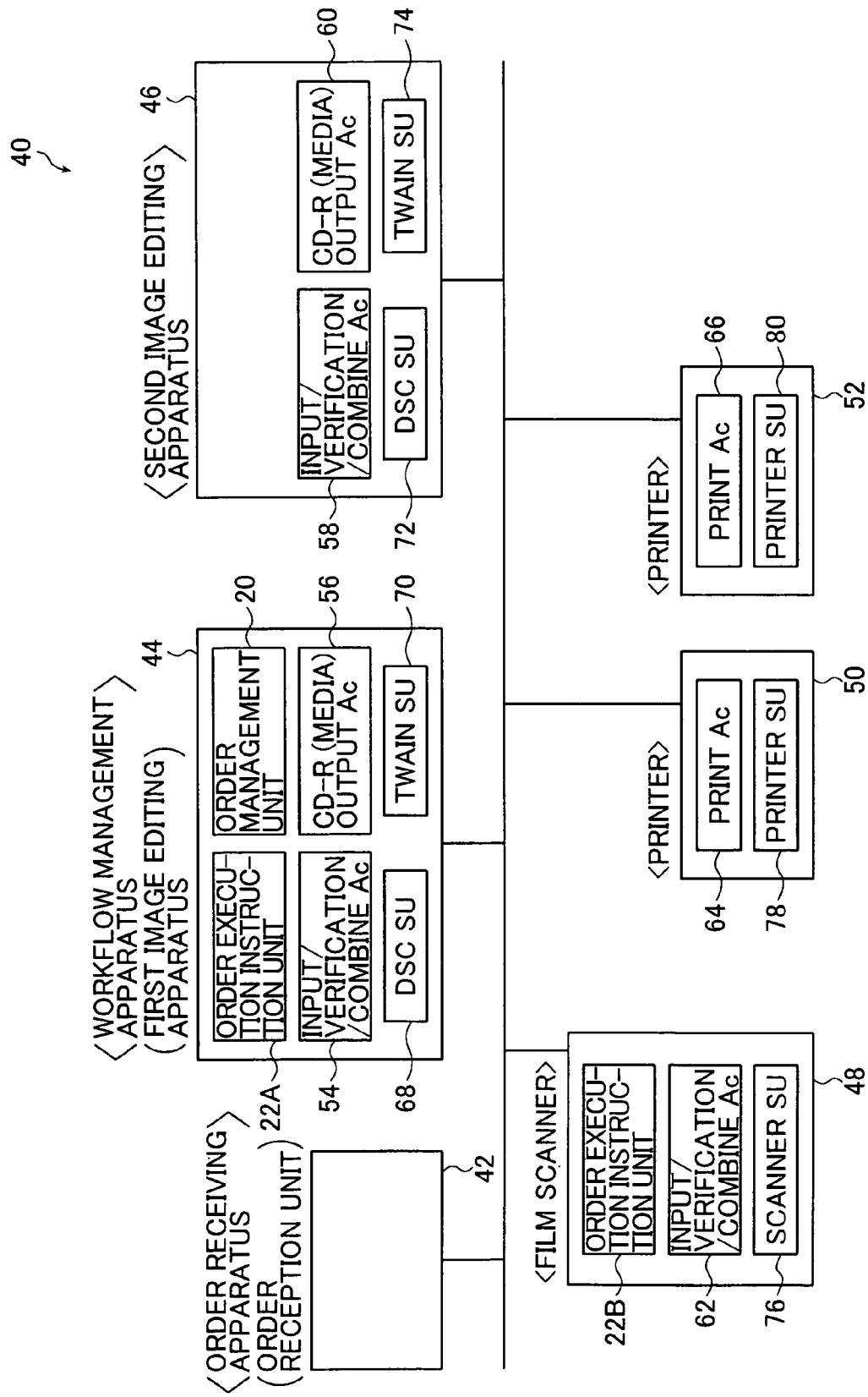
FIG. 2 is a block diagram showing a system configuration example.

FIG. 2 shows an example of apparatus (hardware) constituting the order processing system 10 shown in FIG. 1. An order processing system 40 of FIG. 2 includes an order receiving apparatus 42, a workflow management apparatus 44 also serving as a first image editing apparatus, a second image editing apparatus 46, a film scanner 48, and printers 50 and 52. Those apparatuses are interconnected through a communication line such as Ethernet.

The order receiving apparatus 42 has a function as the order reception unit 12 of the order processing system 10 of FIG. 1, and obtains image data (order target image, input image) of an image to be reproduced and order information. For example, the order receiving apparatus 42 is an automatic print order receiver installed at a photographic laboratory or a variety of stores, a system terminal of the photographic laboratory, or an Internet order reception terminal (personal computer or the like of customer). The order receiving apparatus 42 includes, instruction input means (keyboard, mouse, touch panel or the like) (not shown) used by a customer (user) to enter order information, and a monitor for displaying an order reception screen.

The order receiving apparatus 42 includes, as means for obtaining image data, at least one of a media drive for reading images from various image recording media, a communication device for receiving image data transmitted through a communication line such as the Internet, and a connection device to a digital camera.

The image data that the order receiving apparatus 42 obtains by the image data obtaining means is sent to the workflow management apparatus 44 or the second image editing apparatus 46 to be saved in a DSC SU (68) or a DSC SU (72) which is a storage unit SU.

The workflow management apparatus (first image editing apparatus) 44 includes an order management unit 20 for managing a workflow of the entire order processing system 40 or receiving instruction of orders to be executed. The order management unit 20 is equivalent to the order management unit 20 in the order processing system 10 of FIG. 1.

The workflow management apparatus 44 includes an order execution instruction unit 22A equivalent to the order execution instruction unit 22 in the order processing system 10 of FIG. 1, and an apparatus open information database 24 (not shown).

The workflow management apparatus 44 has a function of an image editing apparatus for executing an input step of identifying image data from a customer stored in the DSC SU (68) to generate a logical image LI, a verification step of the input image data, an image processing step of combining images or the like, and a step of writing the processed image data in a recording medium such as a CD-R according to order contents. Those steps are carried out by an input/verification/combine Ac (54), a media output Ac (56), a DSC SU (68), and a TWAIN SU (70).

The second image editing apparatus 46 has a function similar to that of the workflow management apparatus 44 serving as the image editing apparatus. In other words, an input step of image data from the customer, a verification step of the input image data, and an image processing step of image combining or the like are carried out, and the processed image data can be written in a recording medium such as a CD-R according to order contents. Those steps are carried out by an input/verification/combine Ac (58), a media output Ac (60), a DSC SU (72), and a TWAIN SU (74).

The film scanner 48 photoelectrically reads an image photographed on a photographic film to convert the image into image data, and saves the obtained image data in a scanner SU (76). The film scanner 48 executes an input step of identifying the image data of the scanner SU (76) to generate a logical image LI. When necessary, the film scanner 48 executes a verification step of the input image data and an image processing step of image combining or the like. Those steps are carried out by an input/verification/combine Ac (62) and the scanner SU (76). Additionally, the film scanner 48 has a function of an order execution instruction unit 22B for starting order processing.

The film scanner 48 is not an essential component to constitute the order processing system 40 based on a full-automatic principle. However, if the film scanner 48 is installed, when the customer makes an image reproduction processing order such as print making from a photographic film, it is possible to execute predetermined processing according to the order by using this film scanner 48 to obtain image data from a photographed image of the photographic film.

Each of the printers 50 and 52 has a function of outputting processed image data transferred from the workflow management apparatus (first image editing apparatus) 44, the second image editing apparatus 46, and the film scanner 48 as a photographic print.

The image data obtained by the order receiving apparatus 42 and edited by the workflow management apparatus 44 or the second image editing apparatus 46, or the image data obtained by the film scanner 48 and edited is saved in a printer SU (78) or (80) of the printer 50 or 52, or subjected to print processing.

The printers 50 and 52 may be different in specifications. For example, the printer 50 can be applied as a digital printer of a silver salt photographic system, and the printer 52 can be applied as an ink jet printer. Printers of similar or different types but different in capacity or function such as resolution, corresponding print sizes (paper size), or finishing may be used. The printer 50 may be used as a printer of photographic printing, and the printer 52 may be used as a printer for printing an image on the other product.

The order management unit 20 belonging to the workflow layer 14 of the order processing system 10 of FIG. 1 is disposed in the workflow management apparatus 44 in the order processing system 40 of FIG. 2. The order execution instruction unit 22 of the order processing system 10 is disposed in the workflow management unit 44 (equivalent to execution instruction unit 22A), and the film scanner 48 (equivalent to execution instruction unit 22B).

Activity components Ac belonging to the activity layer 16 of the order processing system 10 are disposed in the workflow management apparatus 44 (equivalent to input/verification/combine Ac (54) and CD-R (media) output AC (56)), the second image editing apparatus 46 (equivalent to input/verification/combine Ac (58) and CD-R (media) Ac (60), the film scanner 48 (equivalent to input/verification/combine Ac (62)), the printer 50 (equivalent to print Ac (64)), and the printer 52 (equivalent to print Ac (66)).

Storage units SU belonging to the imaging layer 18 are disposed in the workflow management apparatus 44 (equivalent to DSC SU (68), TWAIN SU (70)), the second image editing apparatus 46 (equivalent to DSC SU (72), TWAIN SU (74)), the film scanner 48 (equivalent to scanner SU (76)), the printer 50 (equivalent to printer SU (78)), and the printer 52 (equivalent to printer SU (80)).

By distributing the components of each layers among the apparatuses, the order processing system 40 of FIG. 2 constitutes the order processing system 10 of FIG. 1 as a whole. Those apparatuses cooperate to execute order processing.

The number of apparatuses constituting the order processing system 40 is not limited to the example of FIG. 2. For example, two or more order receiving apparatuses 42 may be installed, or one or three or more printers 50 (52) may be installed. The number of image editing apparatus 46 can be increased/decreased.

Next, a processing flow of the order processing system 10 will be described in detail by referring to the order processing system 40 which is a specific apparatus example.

Figure 3:
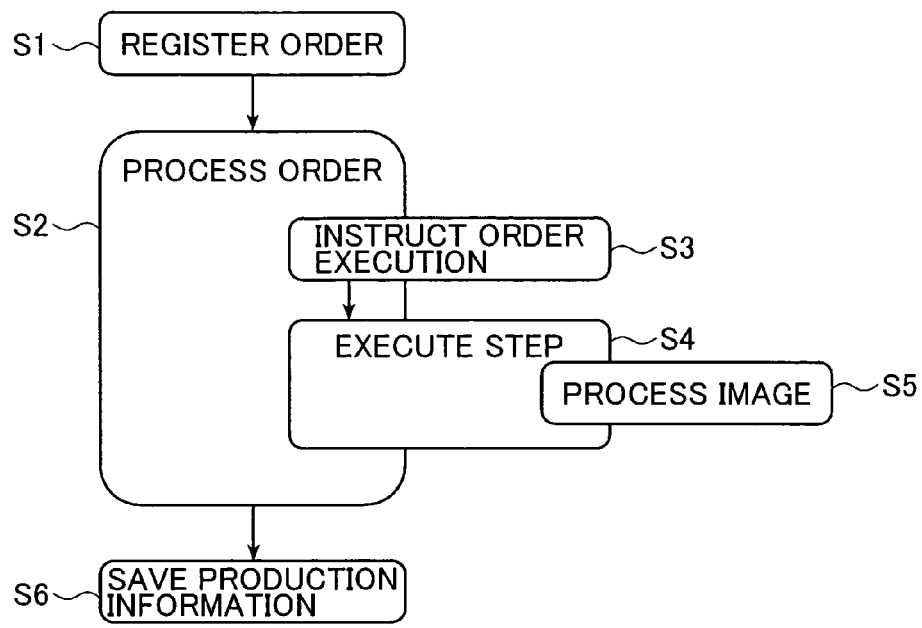
FIG. 3 is a flowchart showing a rough flow of order processing of the order processing system of FIG. 1.

FIG. 3 shows a rough flow of order processing in the order processing system 10. As shown in FIG. 3, in the order processing system 10, upon reception of an order at the order reception unit 12, the order is registered at the workflow layer 14 (step S1), and processing of the order is executed in the workflow layer 14 and the activity layer 16 (step S2).

The processing of the order (step S2) includes order execution instruction from the workflow layer 14 to the activity layer 16 (step S3), and execution of a step at the activity layer 16 and the imaging layer 18 according to the instruction (step S4). The step execution (step S4) includes determination of image processing conditions and processed image reproduction processing in addition to image processing (step S5).

Upon processing of the order (step S2), a job execution situation such as a start/end of each job in the processing is saved as production information in the production information database 30 (step S6).

Processes in the order processing system 10 of FIG. 1 will be described below in sequence along the flow of FIG. 3.

In the order registration of the step S1, first, the order is received, and the received order is registered.

Figure 4:
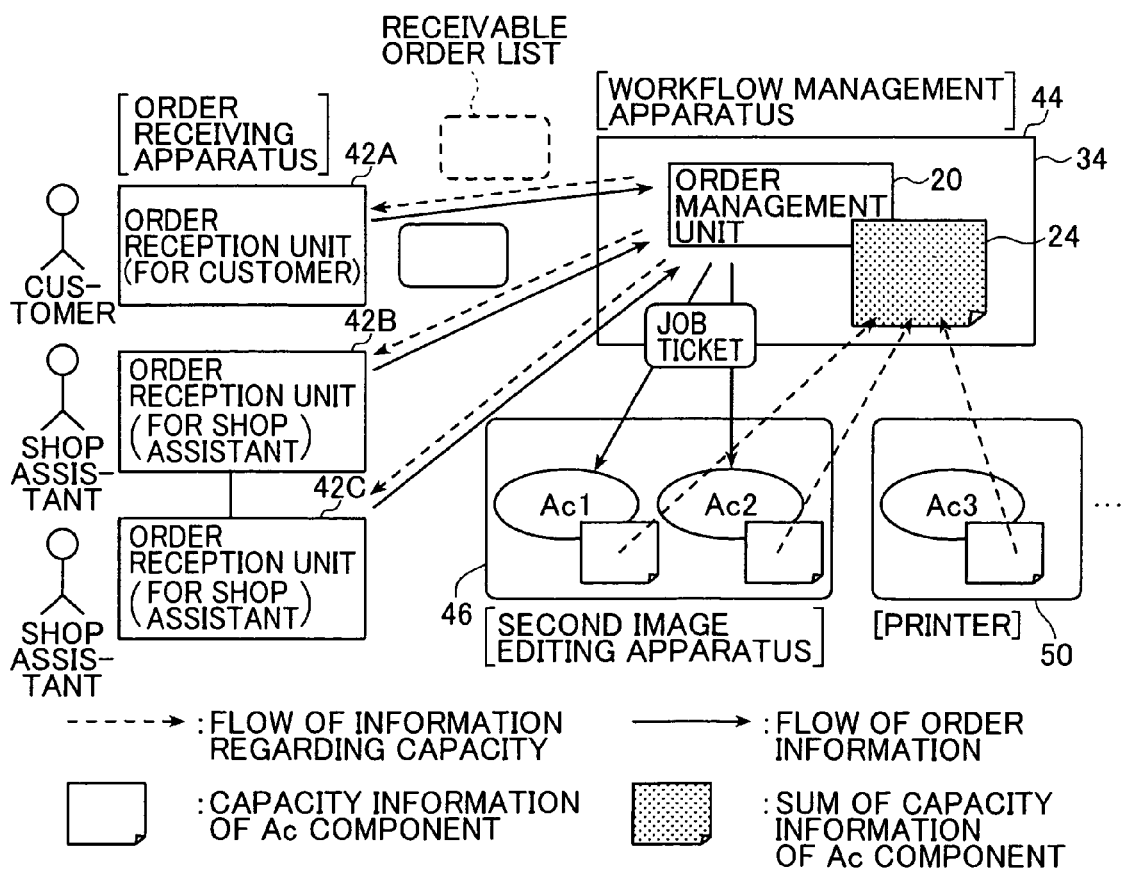
FIG. 4 is a block diagram showing order reception processing.

FIG. 4 schematically shows order reception processing in the order processing system 40 of FIG. 2.

FIG. 4 shows, among the components of the order processing system 40 of FIG. 2, three order receiving apparatuses 42A, 42B, and 42C as the order receiving apparatuses 42, the workflow management apparatus 44, and the second image editing apparatus 46 and the printer 50 representative of the processing apparatuses constituting the order processing system 40. The second image editing apparatuses 46 includes activity components Ac1 and Ac2 (equivalent to input/verification/combine Ac (58) and media output Ac (60)), and the printer 50 includes an activity component Ac3 (equivalent to print Ac (64)).

In FIG. 4, an arrow of a broken line indicates transmission (flow) of activity information which is capacity information of the activity component Ac, and an arrow of a solid line indicates transmission (flow) of order information.

Before the order reception, each of the activity components Ac1, Ac2, Ac3, and so on (activity components Ac (54 to 66) of FIG. 2) discloses own activity information to the workflow management apparatus 44 (refer to arrows of broken lines directed from the second image editing apparatus 46 and the printer 50 to the workflow management apparatus 44 in FIG. 4). The disclosed activity information (apparatus open information containing the same) is registered in the apparatus open information database 24.

The order management unit 20 refers to the activity information held in the apparatus open information database 24, i.e., activity information of each apparatuses constituting the order processing system 40 such as the second image editing apparatus 46 and the printer 50, to create and hold a receivable order list based on a sum of capacity information of the activity components Ac, i.e., capacity information of the entire apparatus group.

Figures 5, 6:
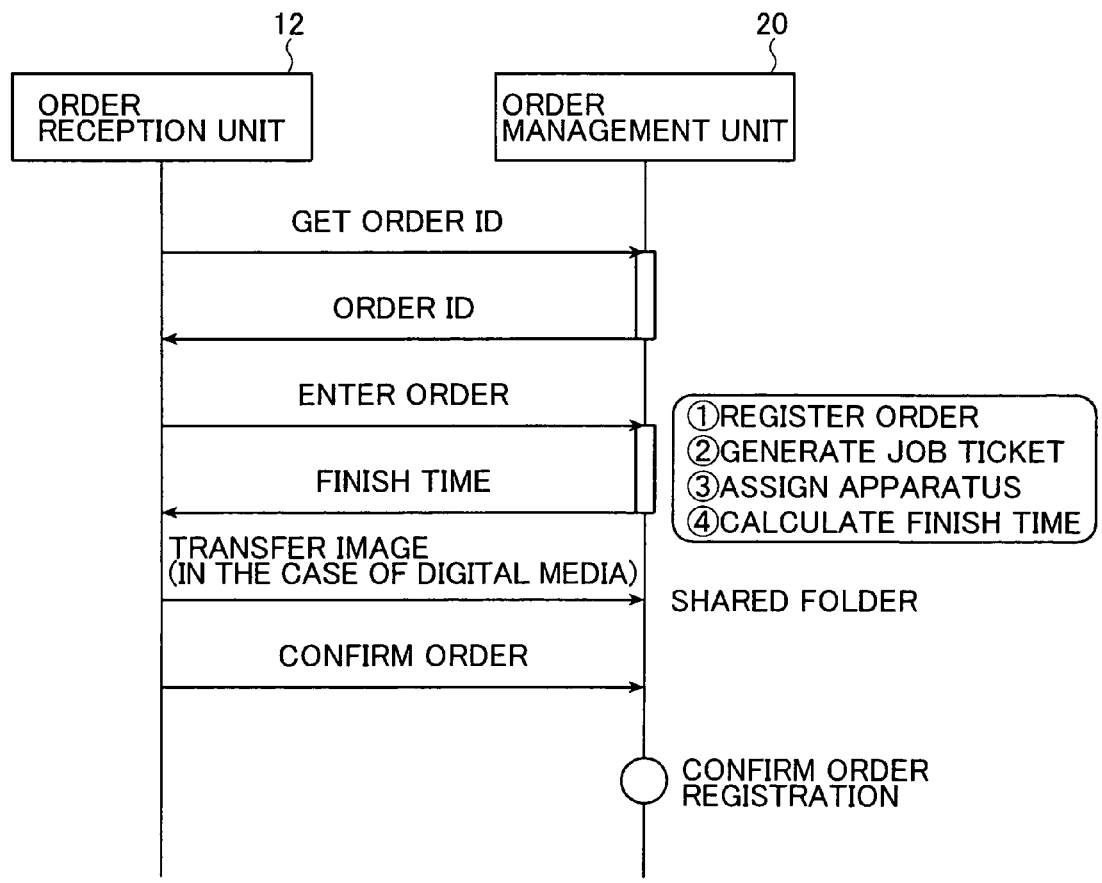
FIG. 5 is a diagram showing an example of a receivable order list.
FIG. 6 is a diagram showing an order registration sequence.

FIG. 5 shows an example of a receivable order list. In FIG. 5, executable items regarding an input step, a processing step, and an output step are listed. Specifically, receivable film types (e.g., 135 negative film, 135 sepia film), recording media types (e.g., memory stick), and file compression forms (e.g., zip) are shown for the input step, executable image processing types (e.g., trimming, red-eye correction, template combining, and color correction) are shown for the processing step, and providable types of prints, recording media or other products (e.g., print sizes 100×200 and 150× 250, CD-R, and Zip file) are shown for the output step.

As described above, the apparatus open information contains the potential capacity information (capacity information to be executed at the maximum according to apparatus specifications) and the current capacity information (capacity information to be currently processed according to apparatus setting) of each activity component Ac (apparatus carrying out its function), and the order management unit 20 creates the receivable order list based on the potential capacity information.

In the case of a system equipped with a plurality of processing apparatuses of similar types (e.g., image editing apparatus, printer), as in the case of the order processing system 40, the order management unit 20 refers to the apparatus open information to create a receivable order list by determining that executable processing at a certain apparatus is executable processing in the order processing system.

FIG. 6 shows an order registration processing sequence in the order registration of the step S1 of FIG. 3. This sequence will be described based on the systems of FIGS. 1 and 4.

When a customer or a shop assistant starts an image reproduction processing order at the order receiving apparatus 42A or 42B or the like, first, order ID acquisition is requested from the order reception unit 12 of the order receiving apparatus 42A or the like to the order management unit 20.

Accordingly, the order management unit 20 issues order ID, and notifies it to the order reception unit 12. At this time, the order management unit 20 sends a receivable order list to the order reception unit 12 (refer to an arrow of broken line directed from the workflow management apparatus 44 to the order receiving apparatus 42A or the like in FIG. 4).

The order receiving apparatus 42A or the like displays receivable order types (menu) on the order reception screen of the monitor based on the received receivable order list.

The customer or the shop assistant selects/enters an item relevant to order contents from the order types displayed on the order reception screen by using instruction input means of the order receiving apparatus 42A or the like, and orders a desired product of a reproduced image.

The order receiving apparatus 42A or the like transmits order information indicating the input order contents to the order management unit 20 corresponding to the order ID notified from the order management unit 20, and requests order registration to the order management unit 20 (refer to an arrow directed from the order receiving apparatus 42A or the like to the workflow management apparatus 44).

Upon reception of the order registration request, the order management unit 20 registers the order in the order information database 28 (refer to FIG. 1) and generates a job ticket. A generation method of job tickets and its configuration will be described below in detail.

During job ticket generation, the order management unit 20 refers to the apparatus open information database 24 to assign an activity component Ac (apparatus) to execute order processing.

Additionally, the order management unit 20 refers to a process situation of each activity component Ac to calculate time until completion of order processing of the proceeding order, and sends it to the order receiving apparatus 42A or the like. Scheduled completion time (delivery time) is presented at the order receiving apparatus 42A or the like.

At the time of order reception, if services can be provided on an express mode in addition to a normal mode, when the scheduled completion time is presented, scheduled completion time in the case of the normal mode, and scheduled completion time in the case of the express mode are presented to prompt the customer to select.

Upon confirmation of the order by an instruction operation of the customer or the like at the order receiving apparatus 42A or the like, the order receiving apparatus 42A or the like reads a target image of the order from a digital media recording the image, and transfers the image to the workflow management apparatus 44 or the second image editing apparatus 46 to store it in the DSC SU (68) or the DSC SU (72) (storage unit SU1 in FIG. 1).

For storage of the order target image, all the received images may temporarily be stored in one predetermined storage unit SU (e.g., DSC SU (68)), or in a storage unit SU of a corresponding apparatus if an apparatus (activity component Ac) for executing order processing has been decided at the time of receiving the order.

Transfer of image data takes time when the number of images is larger or a data size is large. Accordingly, the transfer may be started without waiting for an instruction entry of order confirmation, and unnecessary data may be deleted when the order is cancelled.

If a target image recorded in a film, the operator sets the film in a film scanner 48, whereby image data is obtained by the film scanner 48, and the obtained image data is stored in the scanner SU (76).

Upon transmission of the order information from the order reception unit 12 to the workflow layer 14, the workflow server 26 of the order management unit 20 fetches the order information of the order received by the order reception unit 12 to register it in the order information database 28 (refer to FIG. 1). Thus, currently received unprocessed orders are stored in the order information database 28.

Figure 7:
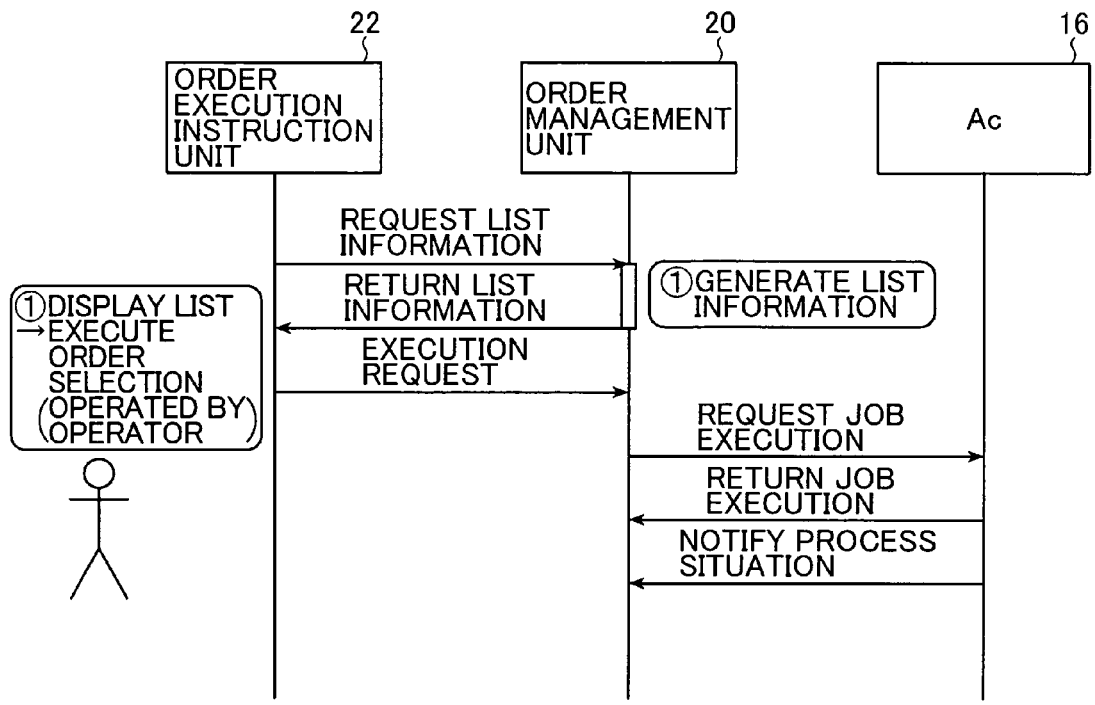
FIG. 7 is a diagram showing an order execution instruction sequence.

Next, in the order processing of the step S2, the order management unit 20 instructs order execution to the activity layer 16 based on order execution instruction from the order execution instruction unit 22. FIG. 7 shows a sequence from the order execution instruction (step S3) to the process execution (step S4).

First, list information of orders (jobs) registered in the order information database 28 is requested from the order execution instruction unit 22 to the order management unit 20 (list information request).

The order management unit 20 reads data from the order information database 28 in response to the request, and generates list information of the registered orders to send it to the order execution instruction unit 22 (list information response).

The order execution instruction unit 22 displays a list of orders based on the order list information.

In the order execution instruction unit 22, the operator selects an execution target order from the order list, and instructs execution. Then, the order execution instruction unit 22 requests job execution to the order management unit 20 (execution request).

Upon reception of the execution request, the order management unit 20 passes the job ticket of the order to an activity component Ac which executes a first step among the activity components Ac of the activity layer 16 and instructs job execution to the activity component Ac (job execution request).

At the activity layer 16, each step is executed at assigned activity component Ac in response to the job execution instruction (job execution response) and based on the received job ticket. At this time, each activity component Ac gives a notice according to a step progress situation, e.g., a start/end of step execution, to the workflow server 26 of the order management unit 20 (step situation notification).

Figure 8:
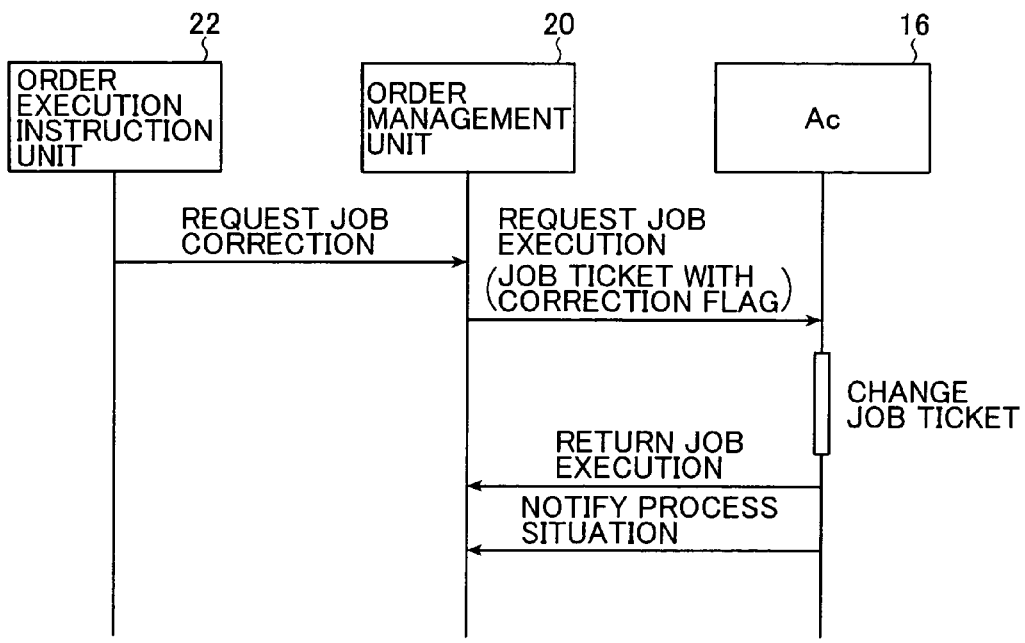
FIG. 8 is a diagram showing an order content complement sequence.

FIG. 8 shows a sequence of complimenting of an order content when a parameter (e.g., number of prints) not specified at the time of order reception is additionally specified by the operator after the order reception.

When the operator refers to the order list at the order execution instruction unit 22 and specifies supplementation or correction of order contents, order correction is requested from the order execution instruction unit 22 to the order management unit 20 (job correction request).

The order management unit 20 transmits a job ticket with a correction flag to the activity layer 16 to request job execution.

The activity layer 16 changes the job ticket according to the request, and returns the job ticket change to the order management unit 20. The activity layer 16 also notifies a process situation according to a process progress.

Figure 9:
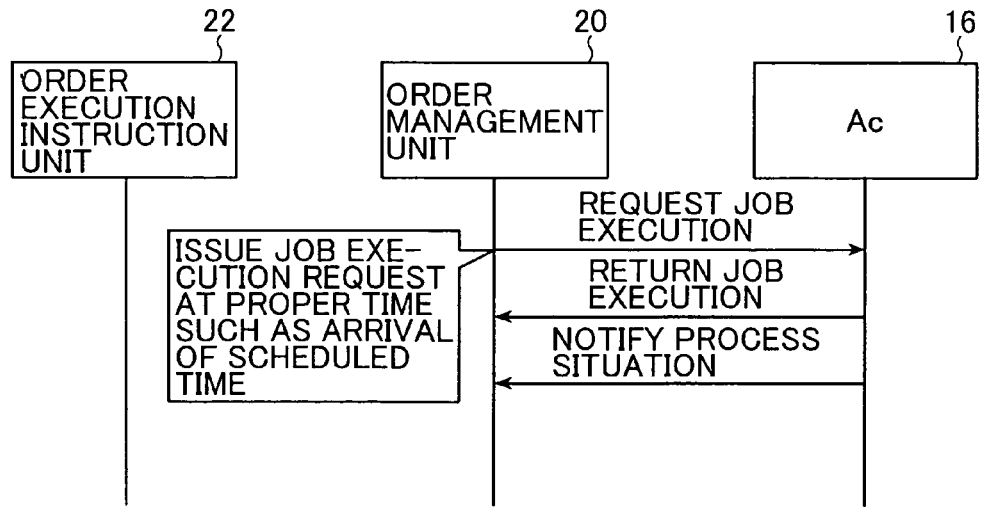
FIG. 9 is a diagram showing an automatic execution processing sequence.

The aforementioned is an example where the order execution instruction unit 22 executes the job execution request under the instruction from the operator. On the other hand, as shown in FIG. 9, in the case of an automatic execution order for executing automatic execution processing, a job execution request is automatically issued from the order management unit 20 to the activity component Ac of the activity layer 16 by taking a proper opportunity such as arrival of scheduled processing start time without any operator's operation.

For example, automatic execution processing can be carried out for orders of services for outputting prints of already verified images such as print services ordered via the Internet, services for automatically verifying images to output prints such as digital camera print services (printing services of photographed images by digital camera), or services for converting CD-R images to execute CD-R outputting (CD-R output services). Whether an order is to be subjected to automatic execution processing (automatic execution order) can be decided based on service definitions (steps and their attributes used for services) or a laboratory policy (process setting or the like at a laboratory shop).

A job ticket generation method, its configuration, and its operation will be described.

As described above, the job ticket is procedure information describing processing steps and contents based on apparatus open information of each step, and information which defines step execution sequence (process flow) for processing orders, processing contents, and an execution destination (apparatus).

Figure 10:
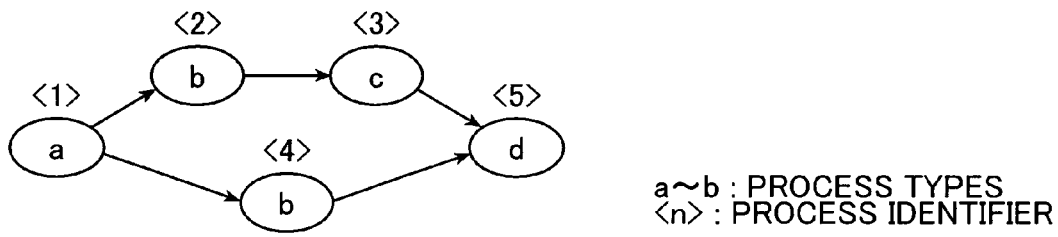
FIG. 10 is a diagram showing an example of a process flow.
Figure 11:
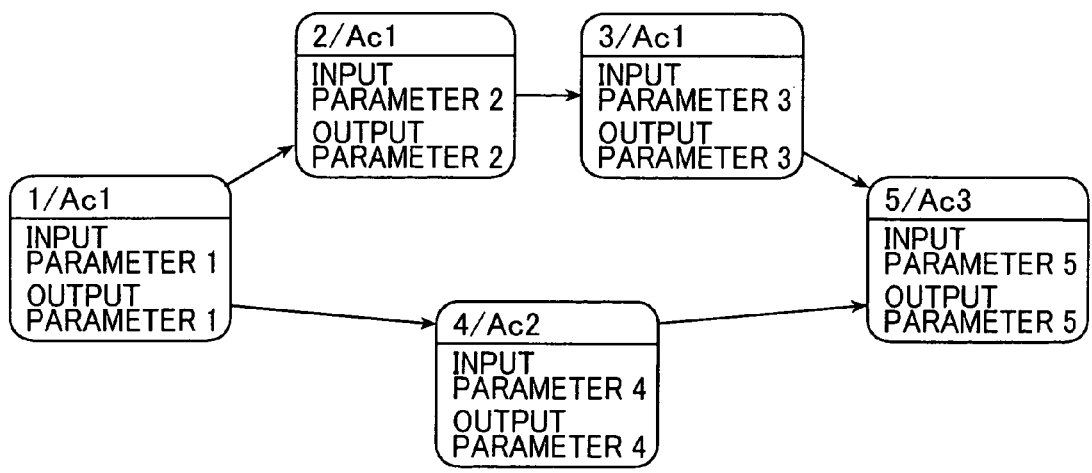
FIG. 11 is a diagram showing an example of a job ticket of the process of FIG. 10.

FIG. 10 shows an example of an order process flow, and FIG. 11 shows an example of a job ticket generated for the order subjected to the process flow of FIG. 10.

The process flow of FIG. 10 indicates existence of execution of steps a→b→c→d and execution of steps a→b→d for one order. Both routes of a branched process include steps b. To secure uniqueness, however, different step identifiers <n> are added to the two steps b.

The job ticket has items of an order identifier, a job ticket identifier, and an execution step identifier as information regarding the job ticket. The execution step identifier is dynamically updated when the job ticket is transferred between the steps.

As shown in FIG. 11, the job tickets has items of a step identifier n, an identifier Ac-k of an activity component Ac for executing the process, an input parameter i, and an output parameter i as information regarding the process flow. The input parameter is input information for executing processing by the activity component Ac which executes the process, and contains information regarding an image necessary for the processing such as an image storage folder path, a print size, or the number of prints. The output parameter is processing result information of the activity components Ac which has executed the process, and contains production information such as the number of output images.

The information regarding the process flow represents steps and an execution sequence (process flow) necessary for generating a product.

Figure 12:
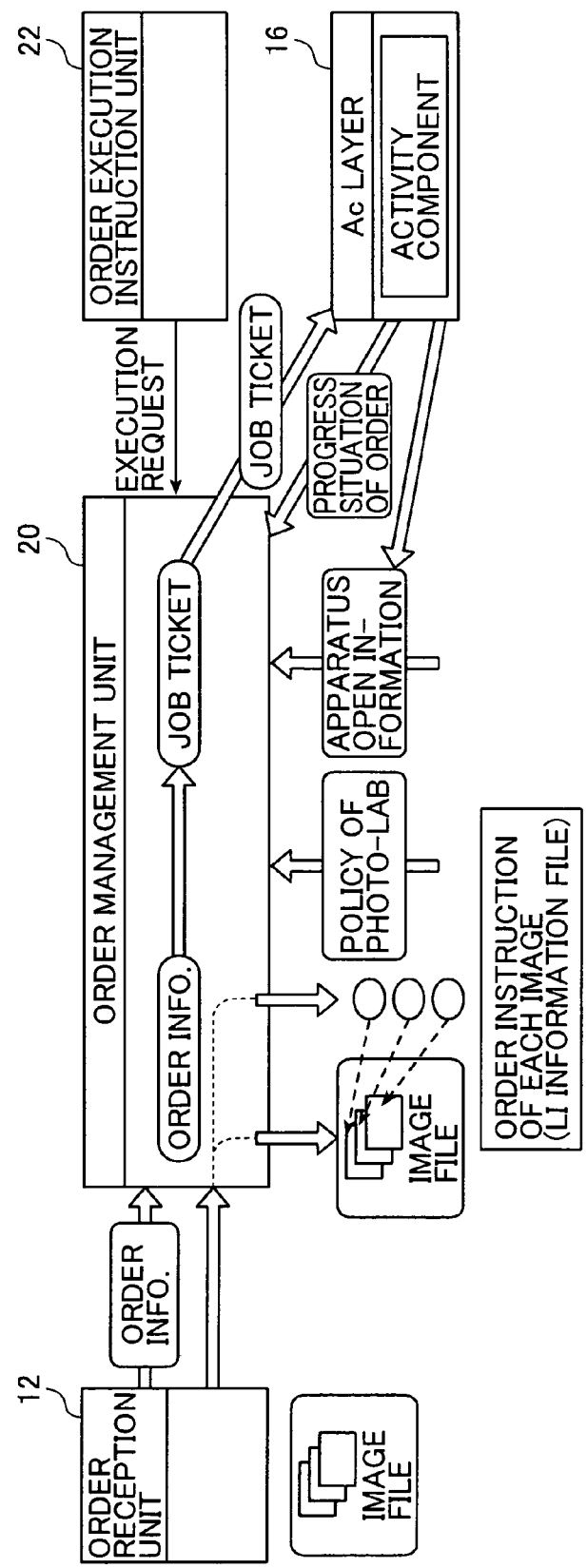
FIG. 12 is a diagram showing a job ticket generation/insertion processing flow.

FIG. 12 shows a process flow from generation of a job ticket to its entry into an activity component Ac in charge of a first step.

As shown in FIG. 12, upon transmission of order information from the order reception unit 12 to the order management unit 20, the order management unit 20 generates and holds a job ticket based on the order information. For generating the job ticket, the order management unit 20 refers to the apparatus open information of the apparatus open information database 24, the policy of the laboratory shop (processing setting or the like at the laboratory shop), and the order progress situation (process situation) sent from each activity component Ac of the activity layer 16 to decide a step execution sequence for processing the order (process flow), processing contents and each step execution destination (activity component Ac; apparatus). Information other than the aforementioned may be added as a reference to decide jobs.

The order management unit 20 (workflow server 26) refers to the potential capacity information and current capacity information of each activity component Ac saved in the apparatus open information database 24 to set activity components Ac on processing steps by selectively using the potential capacity information and the current capacity information according to order contents, thereby issuing a job ticket.

Corresponding to this, the workflow server 26 functions as timing control means for controlling timing to match the current capacity with the order contents, and controls the apparatus to change its current capacity, i.e., apparatus setting, by proper timing compliant with a job process situation, or prompts the operator of the apparatus to execute such.

As an example, a case where the printer 50 of the order processing system 40 is a mini-lab machine of a silver salt system capable of setting two types of paper magazines will be described. If currently set paper widths (paper widths of set magazines) are 89 mm and 203 mm based on the current capacity information obtained from the printer 50 and a print size of order contents is K size (king size) (152 mm×102 mm), a current capacity of the printer 50 (print Ac (64)) contradicts the printer order contents, and cannot be dealt with in this state. However, if apparatus specifications (potential capacity information) of the printer 50 can handle the paper width (152 mm or 102 mm) of the order contents, the workflow server 26 of the order management unit 20 judges that print processing is possible at the printer 50 and issues a job ticket describing a print process of the printer 50.

Then, according to a job process situation, at proper time, i.e., between job units or when nonuse of one of the two types of paper magazines is obvious from job contents before a start of using the paper width of the order contents, the workflow server 26 displays a necessity of a change to a paper magazine having a proper paper width to the monitor or the like of the workflow management apparatus 44 to prompt the operator to change the magazine.

As another example, in the case of the printer 50 which can switch a recording pixel density between 300 dpi and 600 dpi, the workflow server 26 of the order management unit 20 issues a job ticket describing switching of a recording pixel density to 600 dpi for processing of a print order when the order includes a character combined image even if a current capacity of the printer 50 is set to 300 dpi. Accordingly, it is possible to clearly record a character part which requires a high resolution.

Upon reception of execution instruction from the order execution instruction unit 22 (when predetermined timing is reached in the case of automatic execution processing), the order management unit 20 enters a job ticket corresponding to the order to the activity component Ac being assigned the first step of the activity layer 16.

Figure 13:
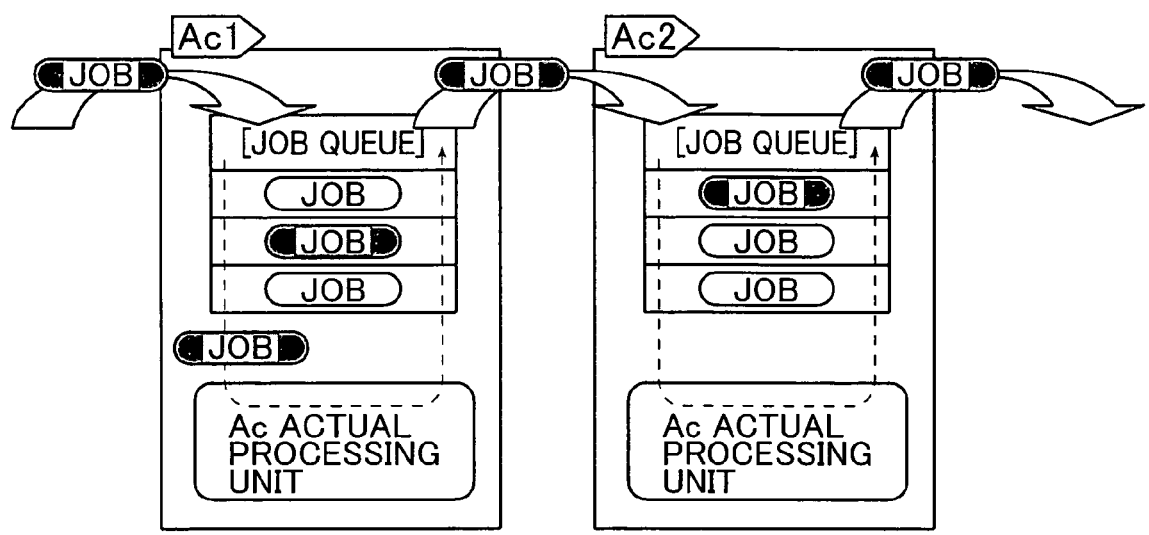
FIG. 13 is a block diagram showing job transfer between job queues.

As shown in FIG. 13, a job queue (job queue manager) is assigned to each activity component Ac, and this job queue manages transfer of a job ticket and a logical image LI between the activity components Ac.

Next, as a modified example of the job ticket generation method and an example of processing execution by the job ticket, a job ticket generation method when a process is branched/combined in one order will be described.

Some of the orders received by the order processing system 10 (order processing system 40) may require that products be produced by using different output apparatuses while they are ordered in the same order processing in the order reception unit 12.

For example, an order including creation of a photographic print at the silver salt printer and a CD recording processed image data, and an order including creation of a photographic print of a service size (e.g., L size 89 mm×127 mm) which is executable at the printer 50 (e.g., silver salt mini-lab machine) in the order processing system 40 of FIG. 2, and creation of a poster (e.g., A1 size) which is executable only at the printer 52 (e.g., large ink jet printer) are cited.

When two image editing apparatuses (44, 46) are installed as in the case of the order processing system 40, preferably, processing efficiency is increased by executing basic processing at one editing apparatus while executing additional processing at the other editing apparatus to properly distribute the process.

For example, for an order including creation of a normal photographic print and a product such as a calendar or a picture postcard where template combining is executed, setting-up of all the ordered image data is carried out by one image editing apparatus (e.g., workflow management apparatus (first image editing apparatus) 44). For the image data for creating the normal print, the image data after the setting-up is output to the printer. For the image data where image combining is executed, the image data after the setting-up is sent to the other image editing apparatus (e.g., second image editing apparatus 46), and subjected to template combining at the image editing apparatus to be output to the printer.

For another example, when red-eye correction processing is carried out for a photograph printing order of a plurality of images, setting-up and red-eye detection of all the images are executed at one image editing apparatus to classify the images into those which need red-eye correction and those which need no red-eye correction. The images which need no red-eye correction are first output to the printer, while the images needing red-eye correction are subjected to red-eye elimination processing at the other image editing apparatus, and then output to the printer.

In the case of each of the aforementioned examples, the order management unit 20 first issues a job ticket describing the entire process, and divides the job tickets at a point of time of starting a different process in the midway (process branches).

As a last step, there is a request for arranging a collating/bagging step to check whether a product from each output apparatus matches order contents.

In this case, the divided job tickets are combined again by identical identifier, and order contents are reproduced in the collating/bagging step. For example, displaying of an order number and the order contents on the monitor is enabled, or the order contents are output to paper by printers. Accordingly, the collating work can be facilitated.

Job ticket dividing/combining when jobs (steps) branch/combine will be described more in detail.

Figure 15:
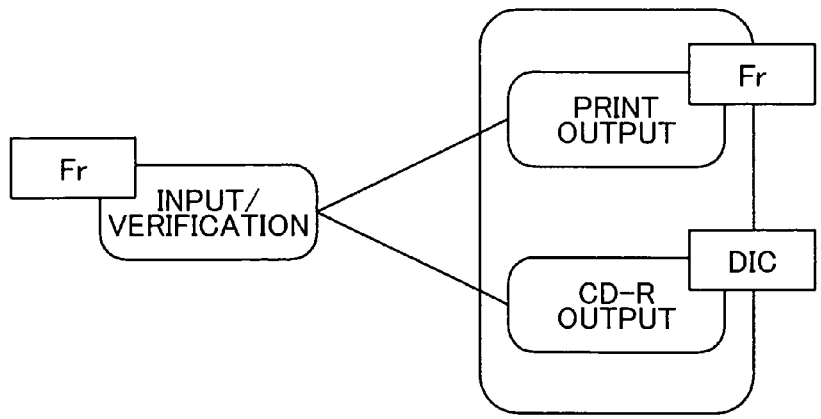
FIG. 15 is a block diagram showing an example of process branching.

The job (step) branching means a case where a plurality of steps immediately after a certain step exist, and can be executed simultaneously in parallel. For example, as shown in FIG. 15, after verification of an input image, processes are executed in parallel at two apparatuses of a print output (output machine Fr in the figure) and a CD-R output (output machine DIC in the figure).

The divided job tickets are given identical identifiers so that the order management unit 20 (the workflow server 26) can recognize that they are job tickets of the same order.

Figure 16:
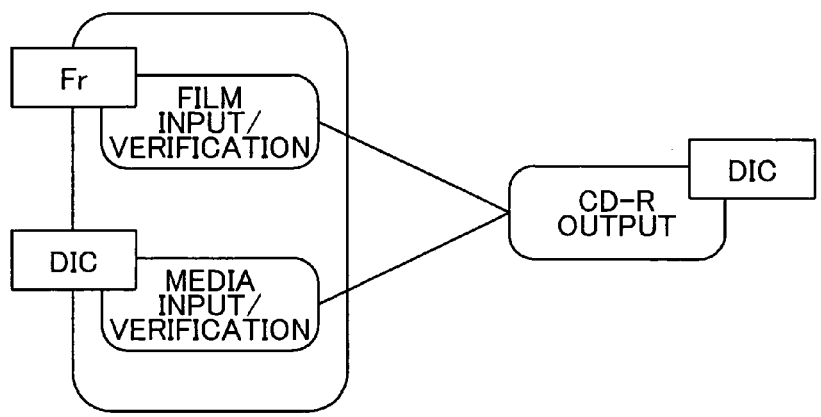
FIG. 16 is a block diagram showing an example of process combining.

The job (step) combining means a case where a plurality of steps immediately before a certain step exist, and a result obtained by waiting for an end of each step is reflected in its step processing. For example, as shown in FIG. 16, after an image input/verification step from a film (input machine Fr in the figure) and an image input/verification step from a medium (input machine DIC in the figure), images obtained in these steps are output to the same CD-R.

Job ticket dividing/combining corresponding to the job branching/combining is carried out by a job queue of an activity component Ac which becomes a division source or a combination destination. In other words, the job queue of such activity component Ac functions as job dividing or combining means.

Figure 17:
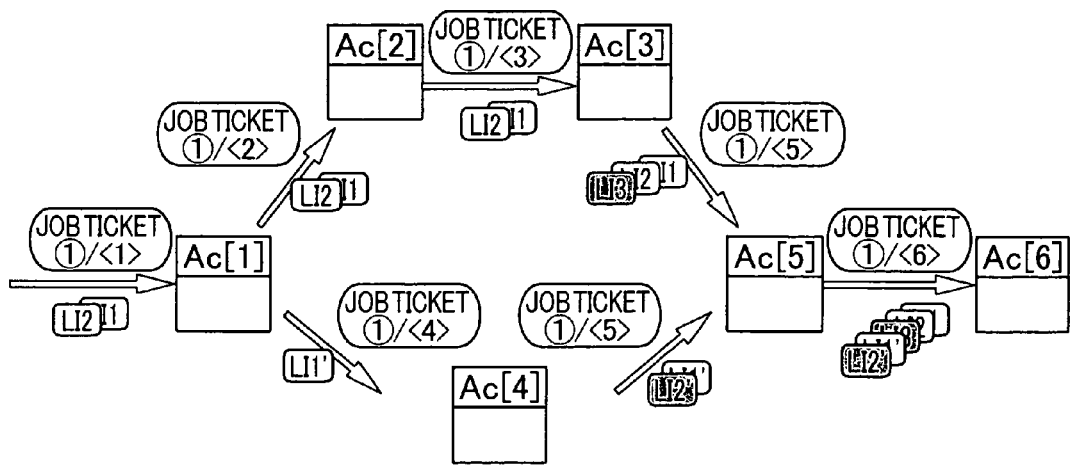
FIG. 17 is a diagram showing a job ticket flow in job division/combination.

FIG. 17 shows a job ticket flow when the jobs are branched/combined.

When the job is branched, the job tickets are divided corresponding to branched steps, and the divided job tickets are transferred between the activity components Ac to proceed with processing job. Each of the divided job tickets holds a job ticket identifier identical to that of the job ticket before the division. Accordingly, a job of the same order can be uniquely identified.

When the job is branched, preferably, the jobs are combined at the last step, and processing contents of that one job are output by displaying on the monitor, printing out or the like. Accordingly, when a plurality of types of products are produced, it is possible to facilitate work of checking all the products as one order.

Figure 18:
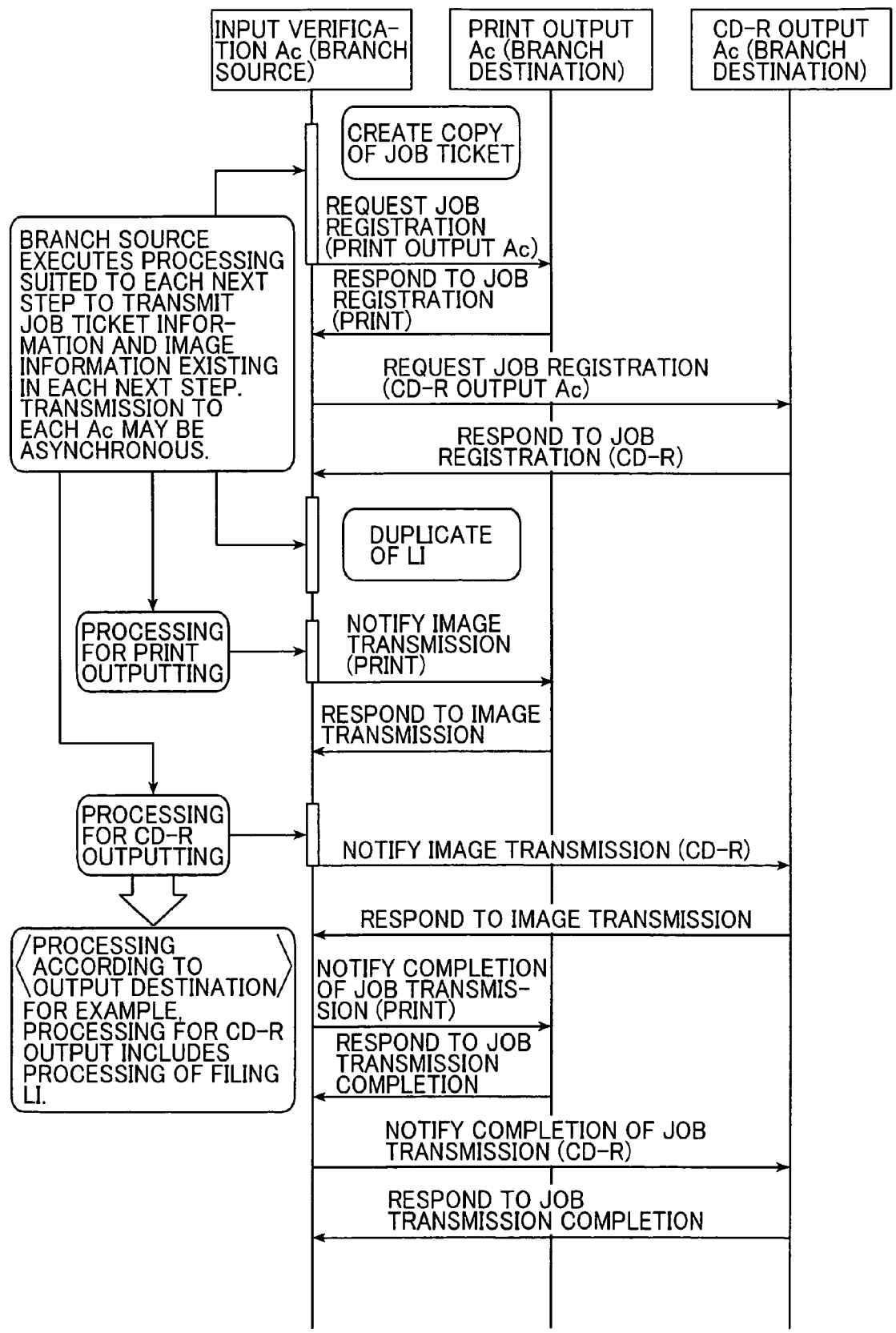
FIG. 18 is a diagram showing a processing sequence of process branching.

FIG. 18 shows an example of a processing sequence of the activity components Ac for executing the process (branching process) of FIG. 15.

When the job is branched, the divided job tickets are transferred independently of each other between the activity components Ac. As described above, the divided job tickets hold identical job ticket identifiers and, regarding execution step identifiers, identifiers of steps after branching are held. Thus, based on a combination of a job ticket identifier and an execution step identifier, it is possible to uniquely identify a job ticket by a branch unit.

In the example of FIG. 18, in the processing step of printing the image and recording it in the CD-R after image inputting/verification (refer to FIG. 15), an input/verification Ac (activity component) transmits the job ticket and the logical image LI (image information) to the print output Ac and the CD-R output Ac for executing the steps after the branching. The transmission to both Ac's may be asynchronous.

The input/verification Ac as a process branch source divides (copies) a job ticket and copies (when sent to both Ac's) or distributes (when sent to one Ac) a logical image LI, and then, executes processing suited to each step (output destination) of the print output Ac and the CD-R output Ac as branch destinations to transmit the job ticket and the logical image LI matched with outputs of each of the next steps.

Subsequently, the job ticket and the logical image LI are transmitted to the print output Ac and the CD-R output Ac (job registration request, image transmission notification, and transmission completion notification).

Processing suited to the output destination is, for example, file formation processing or the like of the logical image LI and the corresponding real image in the case of the CD-R output.

Figure 19:
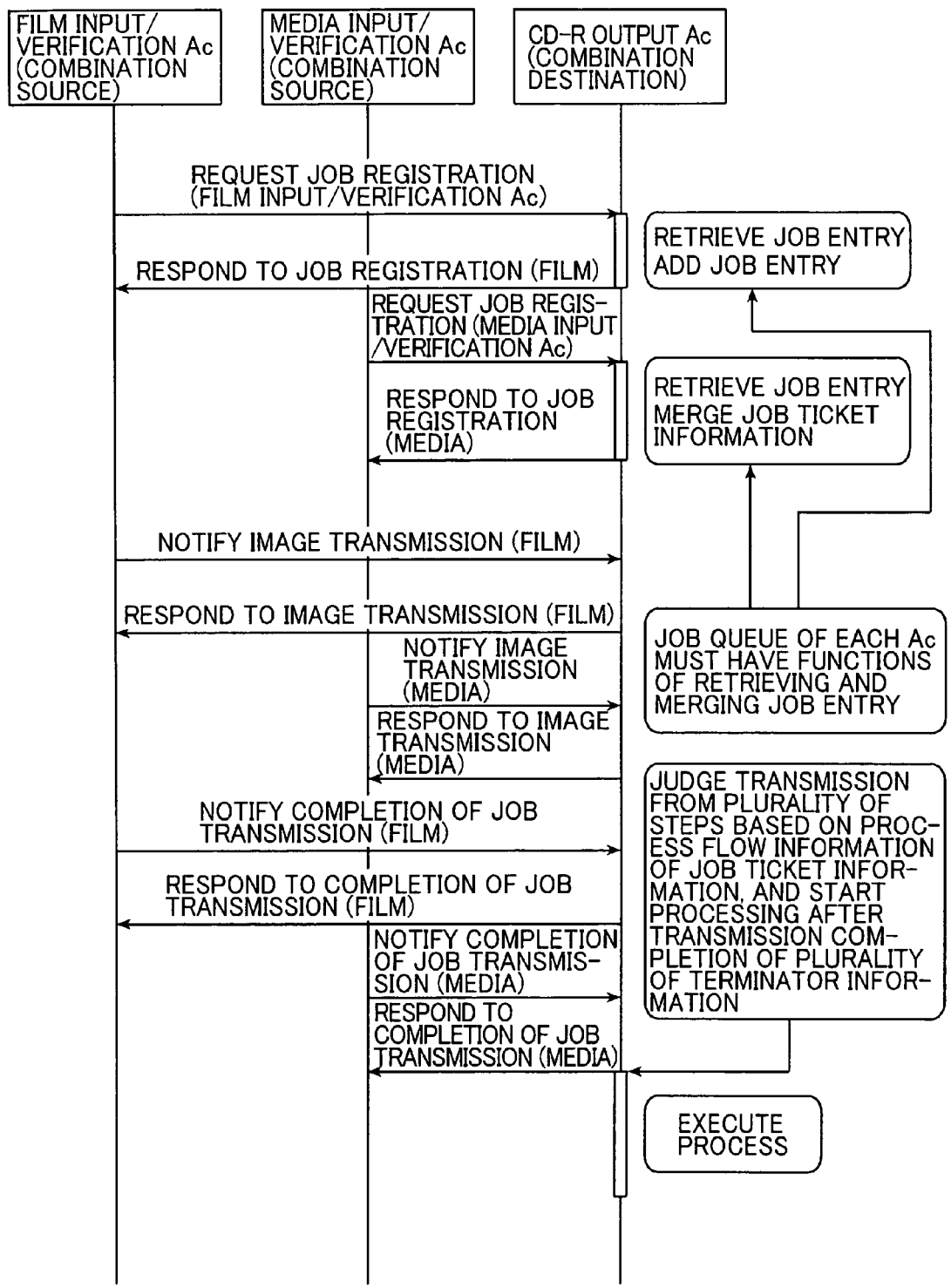
FIG. 19 is a diagram showing a processing sequence of process combining.

FIG. 19 shows an example of a processing sequence of the activity components Ac for executing the process (combining process) of FIG. 16.

The job queue of the activity component Ac for executing the combining process merges job tickets (having identical job ticket identifiers) received from previous steps. For example, a subsequently received job ticket is written on a first received job ticket to be merged together. When the job queue transmits the job ticket to a next step, a value of an execution step identifier is rewritten with a step identifier of the next step.

A processing method and a transmission sequence of logical images LI received from a plurality of steps may be decided by an Ac actual processing unit of the activity component Ac for executing the combining process.

In the combining process, a plurality of presteps exist, but timing for these presteps to start/finish processing is decided arbitrarily. Accordingly, the activity component Ac of the combining process determines transmission of data from the plurality of presteps based on process flow information of the job ticket, and waits for arrival of all the data to start processing.

FIG. 19 shows an example of the processing step (refer to FIG. 16) for outputting the image where the image data from the film has been subjected to input and verification and the image where the image data from the image recording medium has been subjected to input and verification to the CD-R. A film verification Ac and a media input Ac transmit the job ticket and the logical image LI (image information) to the CD-R output Ac (job registration request, image transmission notification, and transmission completion notification).

The CD-R output Ac as a combining destination starts CD-R output processing upon reception of data terminator information (end information, and job transmission completion notification) from the film verification Ac and data terminator information from the media input/verification Ac.

The activity layer 16 sequentially executes steps according to job tickets.

A job defined in one job ticket includes a plurality of steps such as an input step, a verification step, and a print output step. Each step is executed by a specific activity component Ac assigned by the order management unit 20. For example, the verification step is executed by the verification activity component Ac, and the print output step is executed by the print output activity component Ac. One activity component Ac may be in charge of a plurality of steps.

The activity component Ac executes a step assigned to itself by the job ticket. After completion of work, the job ticket is passed to the activity component Ac in charge of a next step to instruct job execution.

Thus, by sequentially transferring the job ticket among the activity components Ac according to the process flow defined in the job ticket, the activity layer 16 executes the first to last steps specified by the process flow. When the job ticket is transferred, a logical image LI (including image information necessary for executing a next step) of an image input from the input machine such as a scanner is also transferred together.

The transfer of the job ticket and the logical image LI among the activity components Ac is managed by a job queue present in each activity component Ac. FIG. 13 conceptually shows job management at the activity components Ac1 and Ac2.

Each job queue holds a job assigned to its own activity component Ac. The job queue can hold a plurality of jobs, and selects one according to priority to instruct execution to the actual processing unit of the activity component Ac.

At a point of time when execution of the assigned step is finished, a job is transmitted to a job queue of a next step, and the transmitted job is deleted from its own job queue.

When the activity component Ac executes the step, image reading from the scanner or the like, image outputting to the printer, or image processing such as image conversion is necessary. These image processing functions are provided by the imaging layer 18.

The imaging layer 18 supplies not real image information itself (physical image) but image handle information (logical image LI) to the activity layer 16. The activity layer 16 can describe movement processing of image information between media or image processing by a logical operation using the logical image LI. Actual image movement between the media or image processing depends on the media, but a structure is employed where such is hidden in the imaging layer 18 to prevent recognition on the activity layer 16 side.

The imaging layer 18 includes a storage unit SU of an abstract medium. The real image (physical image) to be processed is transferred between the storage units SU. When necessary, image conversion is executed between the storage units SU.

Regarding the job executed for the logical image LI at the activity layer 16, processing to reflect it in the real image is properly carried out at the imaging layer 18.

Figure 14:
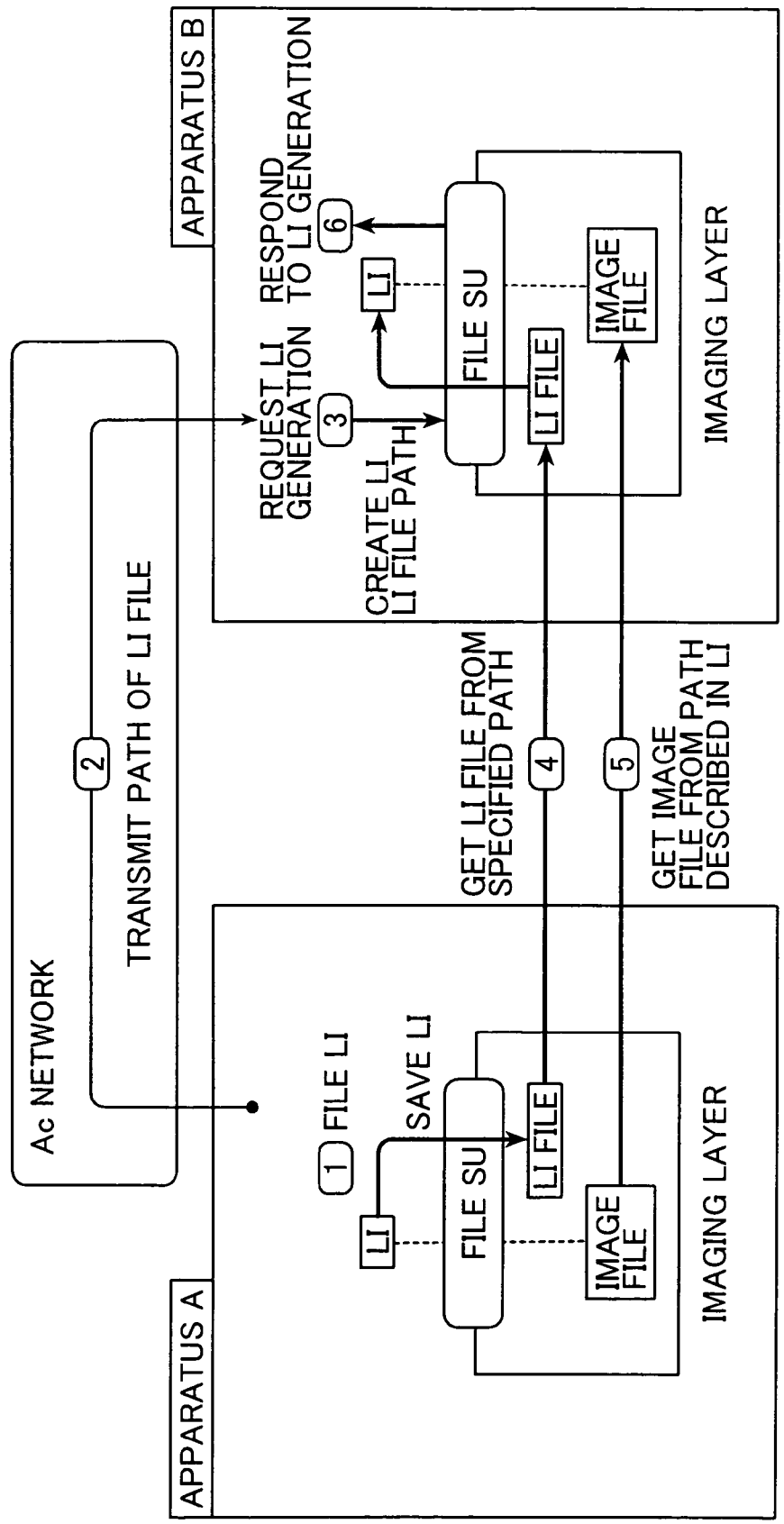
FIG. 14 is a block diagram showing transmission/reception of a job ticket and image information between apparatuses.

FIG. 14 is a block diagram showing a job transfer method over an apparatus from the standpoint of hardware (apparatus). For example, when the job ticket and the image information (logical image LI, real image) are transmitted over apparatuses A and B, the logical image LI is filed at the apparatus A as a transmission source, and a path of the logical image LI file is transmitted to the apparatus B. Upon reception of a request of generating a logical image LI, the apparatus B as a transmission destination obtains the logical image LI file from the specified path of the logical image LI file, and an image file from the path described in the logical image LI to receive the logical image LI and the real image.

Lastly, in the saving step of the production information of the step S6 of FIG. 3, upon reception of a notification of a job execution situation from the activity component Ac, the workflow server 26 saves this information as production information in the production information database 30 by an order unit. At this time, information regarding a product created in the processing job, such as the number of prints, is also transmitted to the workflow server 26.

The order management unit 20 can return the production information by referring to the production information database 30 when the customer (user) or the laboratory manager (operator) requests the production information.

As described above, in the order processing system 10 of the present invention, the three-layer configuration is employed for apparatus software constituting the system, and the data is processed in the form of logical image information between the activity layer 16 and the imaging layer 18.

Accordingly, by processing the image information only in the form of accompanying information, without directly processing the real image (data) as much as possible except when the real image is moved between the apparatuses, it is possible to efficiently carry out image processing by executing processing as if to directly process the real image without being affected by a volume of the image data.

The workflow process management between the workflow layer 14 and the activity layer 16 is carried out by the job ticket based on the apparatus open information.

Accordingly, contents of the job ticket JT only need to be monitored for the process management, and the real image data does not need to be directly attended during the process management. In other words, by applying a configuration where functions are divided into two, i.e., image processing and process management, to the functional portions of each apparatus constituting the image processing system, it is possible to configure an image processing system high in expandability/flexibility as a whole.

The order processing system 10 of the present invention displays the order menu and issues the job ticket based on the apparatus open information of each activity component Ac. Accordingly, it is possible to present the order menu which can make best use of a capacity of the output apparatus.

Especially, the workflow server 26 controls timing for matching the current capacity information with the order contents according to the order contents by taking the potential capacity information/current capacity information of the apparatus open information into consideration. Thus, as the setting (current capacity) of the apparatus can be automatically changed by proper timing or the change can be notified to the operator, it is possible to realize an image processing system with a smooth process.

In the order processing system 10 of the present invention, the workflow server 26 of the workflow layer 14 creates a schedule by deciding a processing sequence of jobs to be ordered from processing contents of a currently executed job, a processing situation of the currently executed job, and processing contents of a job to be executed, and edits the schedule by changing the processing sequence according to the processing situation of the executed job.

Sequential schedule management in real time as described above enables the system to present information as to whether or not processing can be performed in a different delivery time as in an express processing to the customer, and to carry out a processing according to customer's request.

The order processing system 10 of the present invention includes job dividing means based on management of job ticket identifiers, and job combining means when necessary if one order content includes different processing steps to be execute in parallel.

Thus, as the different processing steps can be automatically executed in parallel even in the case of one piece of order information, it is possible to flexibly deal with various order types.

Especially, by bypassing a step of long processing time and setting free time for a frequently used processing, information can be fed back to efficient schedule making.

By reproducing recombined job contents in the collating step, even complex order contents can be easily used for checking the order contents.

The order processing system of the present invention has been described in detail. Needless to say, the present invention is not limited to the embodiments, but various improvements and changes can be made without departing from the gist of the invention.

What is claimed is:

1. An order processing system for performing reproduction processing according to a reproduction processing order by receiving an input image and the reproduction processing order thereof, comprising:

a management unit for generating per order a piece of job instruction information to instruct process contents, a process execution sequence, and a process execution destination for reproduction processing according to contents of the reproduction processing order, and managing an execution of the reproduction processing, and an execution unit including a plurality of components for executing one or more of a plurality of steps of the reproduction processing, for receiving the input image and the job instruction information and executing the reproduction processing according to the job instruction information, wherein said execution unit comprises:

an image processing unit for generating a logical image which is a handle image of a real image from the real image of the received input image and executing processing for the real image, and a job processing unit for executing processing job by using the logical image based on the job instruction information, and wherein the logical image is attribute information in which basic information of an image indicating a size, a center coordinate, and vertical information of the real image, and image edit information are linked with the real image, and wherein said image processing unit executes the processing for the real image based on a result of the processing job carried out for the logical image by said job processing unit.

2. The order processing system according to claim 1, wherein each component of said execution unit discloses potential capacity information and current capacity information of itself to an outside of said execution unit.

3. The order processing system according to claim 2, further comprising an order reception unit for receiving the reproduction processing order of the input image,
wherein said management unit obtains the potential capacity information and the current capacity information of said component disclosed by each component of said execution unit, and creates a list of receivable order contents to present the receivable order contents based on the list to said order reception unit.

4. The order processing system according to claim 2, wherein said management unit refers to the potential capacity information and the current capacity information of said component disclosed by each component of said execution unit to assign each step of the reproduction processing to the component capable of dealing with the step, thereby generating the job instruction information.

5. The order processing system according to claim 1, wherein said execution unit divides the job instruction information at the time of branching a process when two or more types of reproduction processing are included in one reproduction processing order, and executes steps of the two or more types of reproduction processing in parallel according to the divided job instruction information.

6. The order processing system according to claim 5, wherein said execution unit combines the divided pieces of job instruction information at a last step of the reproduction processing to output the combined job instruction information to an outside.

7. An order processing system for performing reproduction processing according to a reproduction processing order by receiving an input image and the reproduction processing order thereof, comprising:
a management unit for receiving the reproduction processing order, and managing an execution of the reproduction processing according to the order, and
an image processing unit for receiving the input image, generating a logical image which is a handle image of a real image from the real image of the input image, and executing processing for the real image, and
a job processing unit for executing processing job by using the logical image according to the reproduction processing order,
wherein the logical image is attribute information in which basic information of an image indicating a size, a center coordinate, and vertical information of the real image, and image edit information are linked with the real image, and
wherein said image processing unit executes the processing for the real image based on a result of the processing job carried out for the logical image by said job processing unit.

8. The order processing system according to claim 3, wherein said order reception unit displays types of receivable orders on a menu of a monitor based on the list.

9. The order processing system according to claim 1, wherein said execution unit notifies information on a job execution situation in each component to the management unit.

10. The order processing system according to claim 9, further comprising an order reception unit for receiving the reproduction processing order of the input image,
wherein said management unit returns the information on the job execution situation to the order reception unit when the information on the job execution situation request is input via the order reception unit.

11. The order processing system according to claim 9, wherein said management unit refers to the information on the job execution situation to manage schedules of processing steps for a new order.

12. The order processing system according to claim 9, wherein said management unit refers to the information on the job execution situation to change a processing sequence of an executed job according to the execution situation of the executed job.

* * * * *